United States Patent
Gupta et al.

(10) Patent No.: US 10,552,330 B2
(45) Date of Patent: Feb. 4, 2020

(54) WAIT CLASSIFIED CACHE WRITES IN A DATA STORAGE SYSTEM

(71) Applicant: INTERNATIONAL BUSINESS MACHINES CORPORATION, Armonk, NY (US)

(72) Inventors: Lokesh M. Gupta, Tucson, AZ (US); Kevin J. Ash, Tucson, AZ (US); Kyler A. Anderson, Sahuarita, AZ (US); Matthew G. Borlick, Tucson, AZ (US); Jared M. Minch, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 15/834,864

(22) Filed: Dec. 7, 2017

(65) Prior Publication Data

US 2019/0179761 A1    Jun. 13, 2019

(51) Int. Cl.
| G06F 12/00 | (2006.01) |
| G06F 12/0871 | (2016.01) |
| G06F 12/0806 | (2016.01) |
| G06F 3/06 | (2006.01) |

(52) U.S. Cl.
CPC .......... *G06F 12/0871* (2013.01); *G06F 3/065* (2013.01); *G06F 3/067* (2013.01); *G06F 3/0619* (2013.01); *G06F 12/0806* (2013.01); *G06F 2212/6042* (2013.01); *G06F 2212/621* (2013.01)

(58) Field of Classification Search
CPC .. G06F 12/0871; G06F 12/0806; G06F 3/065; G06F 3/067; G06F 3/0619; G06F 2212/6042; G06F 2212/621
USPC ........................................................ 711/143
See application file for complete search history.

(56) References Cited

U.S. PATENT DOCUMENTS

| 6,141,707 A | 10/2000 | Halligan et al. |
| 9,201,614 B2 | 12/2015 | Chiu et al. |
| 9,405,355 B2 | 8/2016 | Bahirat |
| 9,513,827 B1 | 12/2016 | Borlick et al. |
| 9,645,747 B2 | 5/2017 | Candelaria et al. |
| 9,727,248 B2 | 8/2017 | Sarcone et al. |
| 2017/0235503 A1 | 8/2017 | Karr et al. |

*Primary Examiner* — Mardochee Chery
(74) *Attorney, Agent, or Firm* — William K. Konrad; Konrad Raynes Davda & Victor LLP

(57) ABSTRACT

In one embodiment, a task control block (TCB) for allocating cache storage such as cache segments in a multi-track cache write operation may be enqueued in a wait queue for a relatively long wait period, the first time the task control block is used, and may be re-enqueued on the wait queue for a relatively short wait period, each time the task control block is used for allocating cache segments for subsequent cache writes of the remaining tracks of the multi-track cache write operation. As a result, time-out suspensions caused by throttling of host input-output operations to facilitate cache draining, may be reduced or eliminated. It is appreciated that wait classification of task control blocks in accordance with the present description may be applied to applications other than draining a cache. Other features and aspects may be realized, depending upon the particular application.

24 Claims, 7 Drawing Sheets

WAIT CLASSIFIED CACHE WRITES IN A DATA STORAGE SYSTEM

BACKGROUND OF THE INVENTION

1. Field of the Invention

The present invention relates to a computer program product, system, and method for wait classified cache writes in data storage systems.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Accordingly, data from a host to be stored in the data storage system is typically directed to a primary device of a primary data storage system at a local site and then replicated to one or more secondary devices of secondary data storage systems which may be geographically remote systems from the primary data storage system. One primary device can have multiple secondary relationships in which data directed to a primary device is replicated to multiple secondary devices.

The process of replicating, that is, copying or mirroring data over to the secondary data storage device can be setup in either a synchronous or asynchronous relationship between the primary data storage device and the secondary data storage device. In a synchronous relationship, any updates to the primary data storage device are typically synchronized with the secondary data storage device, that is, successfully copied over to the secondary data storage device, before the primary data storage device reports to the host that the data storage input/output operation has been successfully completed. In an asynchronous relationship, successful updates to the primary data storage device are typically reported to the host as a successful storage input/output operation without waiting for the update to be replicated to the secondary data storage device.

A storage controller may control a plurality of storage devices that may include hard disks, tapes, etc. A cache may also be maintained by the storage controller, where the cache may comprise a high speed storage that is accessible more quickly in comparison to certain other storage devices, such as, hard disks, tapes, etc. However, the total amount of storage capacity of the cache may be relatively small by comparison to the storage capacity of certain other storage devices, such as, hard disks, etc., that are controlled by the storage controller. The cache may be comprised of one or more of random access memory (RAM), non-volatile storage device (NVS), read cache, write cache, etc., that may interoperate with each other in different ways. The NVS may be comprised of a battery backed-up random access memory and may allow write operations to be performed at a high speed. The storage controller may manage Input/Output (I/O) requests from networked hosts to the plurality of storage devices.

Caching techniques implemented by the storage controller assist in hiding input/output (I/O) latency. The cache may comprise a high speed memory or storage device used to reduce the effective time required to read data from or write data to a lower speed memory or storage device. The cache is used for rapid access to data staged from external storage to service read data access requests, and to provide buffering of modified data. Write requests are written to the cache and then written (i.e., destaged) to the external storage devices.

To guarantee continued low latency for writes, the data in the NVS may have to be drained, that is destaged, so as to ensure that there is always some empty space for incoming writes; otherwise, follow-on writes may become effectively synchronous, which may adversely impact the response time for host writes. Indeed, host writes to a primary data storage system may be intentionally slowed or "throttled" down by intentionally slowing cache write operations on the secondary data storage system caching data mirrored from the primary data storage system to the secondary data storage system. Such throttling of host writes to the primary data storage system may facilitate completely draining a cache on the secondary data storage system in anticipation of loading new programming code on a cluster or other processor of a storage controller of the secondary data storage system.

Task Control Block (TCB) is a task control data structure in the operating system kernel containing the information needed to manage a particular process. Storage controllers may move information to and from storage devices, and to and from the cache (including the NVS) by using TCBs to manage the movement of data. When a write request issues from a host computer to a storage controller, a TCB may be allocated from the operating system code. The TCB is used to maintain information about the write process from beginning to end as data to be written is passed from the host computer through the cache to the storage devices. If the cache is full, the TCB may be queued until existing data in the cache can be destaged (i.e., written to storage devices), in order to free up space. The destage operations may involve the moving of information from cache to storage such as Redundant Array of Independent Disks (RAID) storage and destage TCBs may be allocated for performing the destage operations.

TCBs may be classified on the basis of the task being controlled by the particular TCB. For example, a "background" TCB is a TCB that controls an operation which is not directly related to a host input/output operation. Thus. one example of a background TCB is a TCB which controls a destage operation as a background operation not required as part of a particular host I/O operation. Another example of a background TCB is a TCB which controls a prestage of tracks from storage to cache in which the prestage operation is being performed as a background operation not required as part of a particular host I/O operation.

Another type of TCB is a "foreground" TCB that controls an operation which is typically directly related to a host input/output operation. For example, a foreground TCB may be allocated to perform a destage or stage operation on behalf of a host I/O operation. Thus, a cache miss on a host read typically causes a stage operation controlled by a foreground TCB, to stage one or more tracks from storage to cache to satisfy the host read operation.

Storage controllers frequently employ a safe data commit process which scans the cache directory for modified (often referred to as "dirty") data to be destaged to secondary storage. Such a scan of the cache directory may be initiated on a periodic basis, such as on the hour, for example. A safe data commit process may also be initiated to completely empty a cache in anticipation of a programming load for a processor which caches data in the particular cache.

For example, prior to loading updated programming code on a secondary storage system that has two processing clusters, one processing cluster is quiesced and the caches for both clusters are completely destaged in a "ratchet" process in which the amount of modified data allowed in each cache is ratcheted downward in a sequence of ratchet operations. The amount of modified data remaining in a cache is compared to a modified data threshold level which specifies a target level of modified data to be permitted in the cache. If the amount of modified data in cache is below the target threshold level, a task control block assigned to write one or more tracks of modified data to cache is dispatched and allocates one or more segments of cache to write the track or tracks to cache for subsequent destaging to storage. Conversely, if the actual amount of modified data in cache is above the target threshold level, a task control block assigned to a cache write operation is queued at the end of a wait queue to wait on the wait queue for a minimum duration of time such as six seconds, for example, instead of being immediately dispatched to allocate segments of cache. Once the enqueued task control block reaches the front of the wait queue, if the task control block has been enqueued on the wait queue for at least six seconds, the task control block is dispatched and allocates one or more segments of cache to write a track of modified data to cache. In this manner, a cache write operation may be made to wait for at least six second before cache segments are allocated to write modified data in the cache. This throttles input/output on the primary data storage system since each write on the secondary data storage system is waiting six seconds.

If the cache write operation is a multi-track write operation, after one track has been written to cache, the task control block for the multi-track cache write operation is re-enqueued at the end of the wait queue to wait again on the wait queue for the minimum duration of time which is typically six seconds as noted above. Once the re-enqueued task control block reaches the front of the wait queue, if the task control block has been re-enqueued on the wait queue for at least another six seconds, the task control block is again dispatched and allocates one or more additional segments of cache to write the next track of modified data of the multi-track cache write to cache.

By delaying cache write operations on the secondary storage system, host writes to the primary storage system are also delayed, thereby reducing or "throttling" the overall amount of host write operations to the primary storage system. As a consequence, the amount of cache write operations to the caches of the secondary storage system are also reduced, thereby facilitating draining or destaging the caches of the secondary storage system in anticipation of a programming code loading. For example, each cache write operation may be made to wait for at least six seconds before cache segments are allocated to write modified data in the cache. This throttles input/output on the primary data storage system since each write on the secondary data storage system is waiting six seconds.

As part of the process of draining the cache entirely, the modified data target threshold level is periodically ratcheted down to the next lower level and host write operations to the primary storage system are throttled down as needed until the caches of the secondary storage system have been completely drained. At that point, host output operations may be blocked, storage ownership changed so that the non-quiesced cluster is assigned ("owns") the logical subsystems of storage volumes previously owned by the quiesced cluster, and new programming code may be loaded on the quiesced processing cluster of the secondary storage system. Host output operations may then be resumed and operations of the quiesced processing cluster may be resumed as well, permitting the caches of the secondary storage system to refill. The process may be repeated to quiesce and load new programming code on each cluster of the secondary data storage system, fully draining the caches of the secondary storage system each time.

Mirroring operations which mirror data from a primary storage system to a secondary storage system typically suspend mirroring operations if a write operation from the primary storage system to the secondary storage system does not complete within a predetermined maximum time-out period such as twenty seconds, for example. Because the delay imposed on a typical cache write operation on the secondary storage system to facilitate draining the cache is typically substantially less than the twenty second time-out period, suspension of the mirroring operations as a result of throttling operations may frequently be avoided. However, if the cache write operation is a multi-track write operation of a multi-track mirror operation, repeated enqueuing of the task control block on the wait queue for each track of the multi-track cache write operation can cause the suspend time-out period to be exceeded for the multi-track mirror operation, resulting in an undesirable suspension of mirroring operations.

SUMMARY

One general aspect of a computing environment employing wait classified cache writes in a data storage system in accordance with one aspect of the present description, is directed to classifying a task control block for allocating cache storage for writing tracks of a chain of tracks of a multi-track cache write operation in a first wait class of task control blocks having an associated wait time of a first duration. The classified task control block is queued in a wait queue wherein the task control block is queued classified in the first wait class, and cache storage is allocated to write in cache a track of the multi-track cache write operation using the task control block classified in the first wait class after the task control block has been in the wait queue for a duration of time at least equal to the first duration of time.

In addition, the task control block may be reclassified in a second wait class of task control blocks having an associated wait time of a second duration different from the first duration, and re-enqueued in a wait queue wherein the task control block is re-enqueued reclassified in the second wait class. Additional cache storage is allocated to write in cache another track of the multi-track cache write operation using the task control block classified in the second wait class after the task control block has been in the wait queue for a duration of time at least equal to the second duration of time.

In another aspect, the reclassifying the task control block in a second wait class includes determining whether the task control block has already been in the wait queue for a duration of time at least equal to the first duration of time and reclassifying the task control block in the second wait class of task control blocks if the task control block has already been in the wait queue for a duration of time at least equal to the first duration of time. Further, a task control block classified in the first wait class is in one embodiment, queued at an end position of the wait queue. Also, in one embodiment, a task control block reclassified in the second wait class is queued at a position in the wait queue in front of a task control block classified in the first wait class.

In another aspect, the multi-track cache write operation caches data mirrored from a primary storage controller to a cache of a secondary storage controller in a mirror relationship with the primary storage controller. In yet another aspect, classifying the task control block includes setting a cache modified segment target threshold level, comparing the level of cache modified segments in the cache to the cache modified segment target threshold level, and classifying the task control block as a function of the comparison of the level of cache modified segments in the cache to the cache modified segment target threshold level.

Yet another aspect is directed to throttling down host output operations to the primary storage controller, wherein the throttling includes queueing a task control block in the wait queue if the level of cache modified segments in the cache exceeds the cache modified segment target threshold level. In still another aspect, the cache modified segment target threshold level is repeatedly ratcheted down to reduce the cache modified segment target threshold level in a sequence of increasingly reduced cache modified segment target threshold levels.

Implementations of the described techniques may include hardware, a method or process, or computer software on a computer-accessible medium. Other features and aspects may be realized, depending upon the particular application.

DETAILED DESCRIPTION

Figure 1:
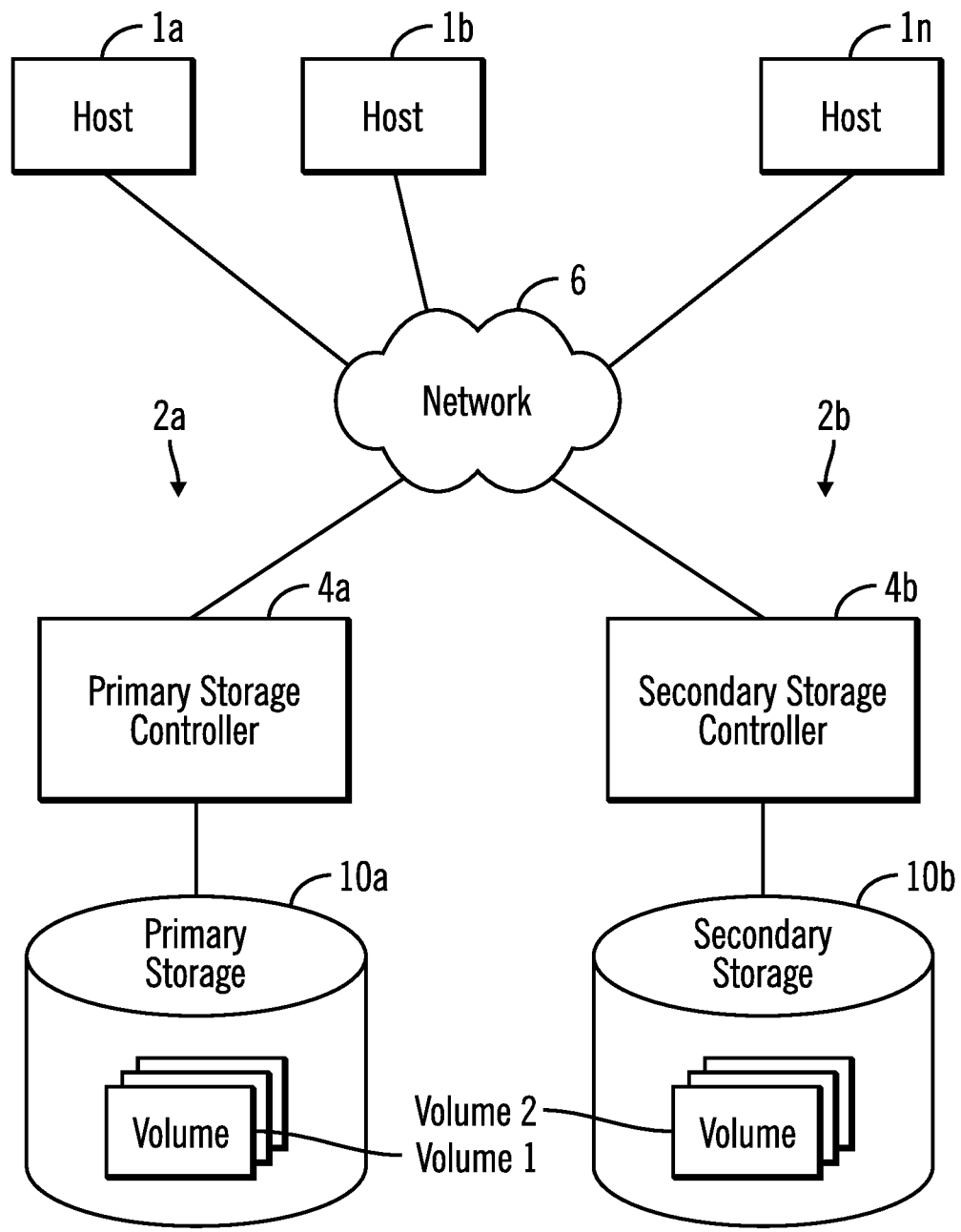
FIG. 1 illustrates an embodiment of a computing environment employing wait classified cache writes in a data storage system in accordance with one aspect of the present description.

In one aspect of the present description, a task control block (TCB) for allocating cache storage such as cache segments in a multi-track cache write operation may be enqueued in a wait queue for a relatively long wait period, such as six seconds, for example, the first time the task control block is used, and may be re-enqueued on the wait queue for a relatively short wait period, such as one second, for example, each subsequent time the task control block is used for allocating cache segments for subsequent cache writes of the remaining tracks of the multi-track cache write operation. As a result, time-out suspensions caused by throttling of host input-output operations to facilitate cache draining, may be reduced or eliminated, particularly for multi-track cache write operations. It is appreciated that wait classification of task control blocks in accordance with the present description may be applied to applications other than draining a cache.

In one embodiment, wait classified cache write logic is configured to classify and reclassify TCBs in connection with cache write operations in one of a plurality of different wait classifications including a short wait classification and a long wait classification, for example, as a function of a target threshold comparison and a reclassification status which indicates whether the particular task control block has previously been classified in a wait classification. More specifically, target threshold level logic is configured to compare the current level of cache modified segments in the cache to a cache modified segment target threshold level. In one embodiment, if the current level of cache modified segments in the cache is above the cache modified segment target threshold level, task control block classification logic classifies the task control block in a first wait class of task control blocks having an associated wait time of a first duration, such as a relatively long duration such as six seconds, for example, or in a second wait class of task control blocks having an associated wait time of a second duration, such as a relatively short duration such as one second, for example, depending upon whether the task control block has previously been classified in the long wait classification. In other words, the classification or reclassification depends upon whether or not the task control block has already been caused to wait in a wait queue for the long duration. It is appreciated that the particular wait durations of each wait class may vary, depending upon the particular application.

In one aspect of the present description, the task control block may include a field which indicates whether the task control block has been classified a first time, that is, whether the task control block already has waited the long duration of time in a wait queue. Conversely the field may indicate whether the task control block has been reclassified one or more additional times in various other wait classifications such that a shorter duration wait is appropriate to avoid unintended suspensions of mirroring operations.

As explained in greater detail below, TCBs classified and reclassified in this manner may be enqueued and re-enqueued in a wait queue for different minimum durations of time for purposes of throttling host input/output operations so as to reduce or eliminate undesired suspensions of mirroring operations due to expirations of time-out periods when draining a cache in a secondary data storage system. Other aspects and advantages may be realized, depending upon the particular application.

A system of one or more computers may be configured for wait classified cache writes in a data storage system in accordance with the present description, by virtue of having software, firmware, hardware, or a combination of them installed on the system that in operation causes or cause the system to perform wait classified cache write operations in accordance with the present description. For example, one or more computer programs may be configured to perform wait classified cache writes in a data storage system by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
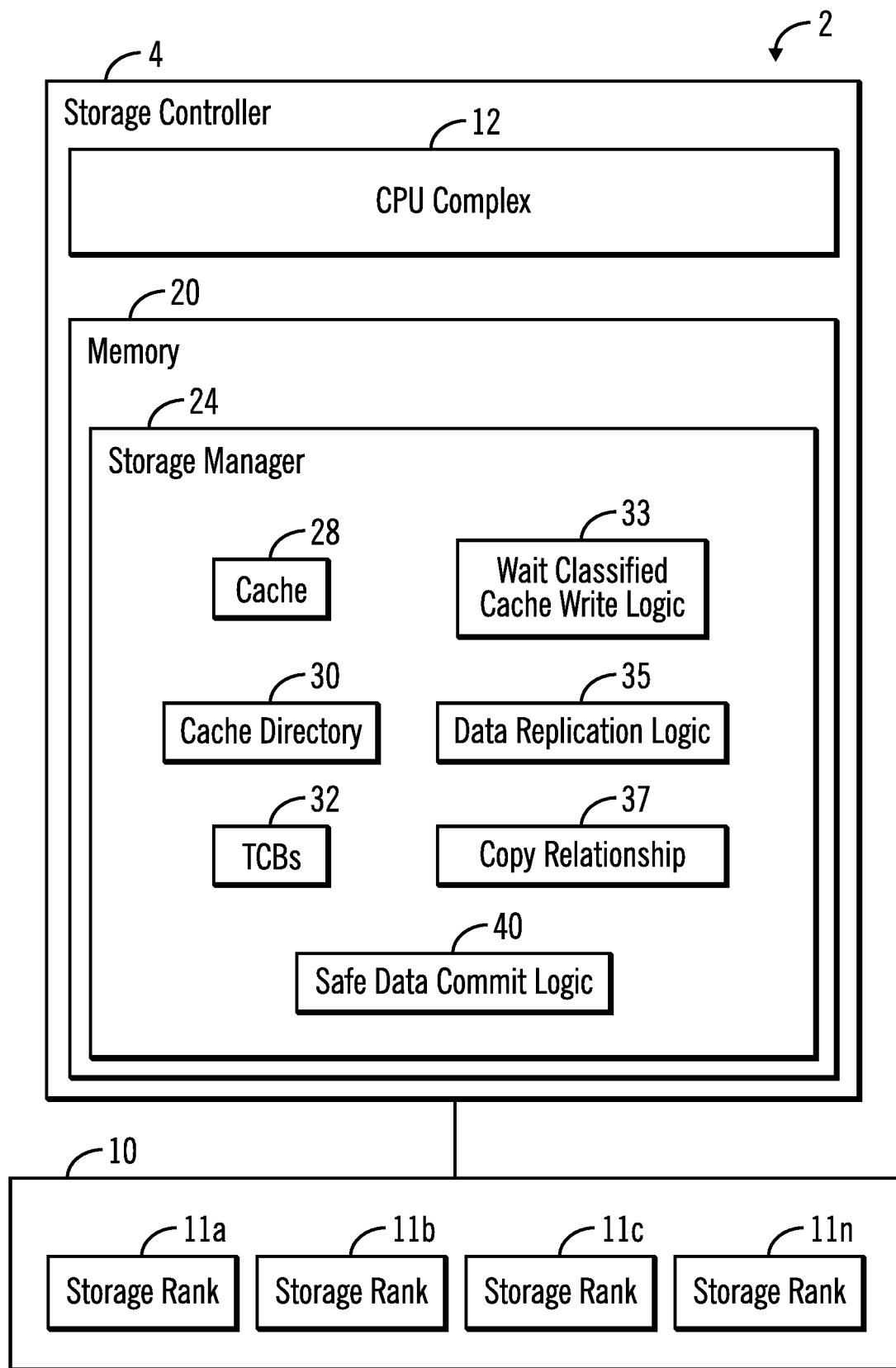
FIG. 2 illustrates an example of a data storage system in the computing environment of FIG. 1.

Implementations of the described techniques may include hardware, a method or process, or computer software on a computer-accessible medium. FIGS. 1, 2 illustrate an embodiment of a computing environment employing wait classified cache writes in a data storage system in accordance with the present description. A plurality of hosts $1a$, $1b$ . . . $1n$ may submit Input/Output (I/O) requests over a network 6 to one or more data storage devices or systems $2a$, $2b$, 2 (FIG. 2) to read or write data. The hosts $1a$, $1b$ . . . $1n$ may be separate physical devices or may be virtual devices implemented using assigned resources of partitions of a server, for example. In a similar manner, the data storage system or systems 2 (FIG. 2), $2a$, $2b$ may be separate physical devices or may be virtual devices implemented using assigned resources of partitions one or more servers, for example.

In the illustrated embodiment, the data storage system $2a$ is a primary data storage system and the data storage system $2b$ is a secondary data storage system in which data stored on the primary data storage system $2a$ by a host is mirrored to the secondary data storage system $2b$. Although the embodiment depicted in FIG. 1 depicts a single secondary data storage system $2b$, it is appreciated that a primary data storage system $2a$ may have more than one secondary data storage system.

Each data storage system 2 (FIG. 2), $2a$, $2b$ includes a storage controller or control unit 4 (FIG. 2), $4a$, $4b$, respectively, which accesses data stored in a plurality of data storage units of storage 10, $10a$, $10b$, respectively. Each data storage unit of the storage 10, $10a$, $10b$ may comprise any suitable device capable of storing data, such as physical hard disks, solid state drives, etc., known in the art. Thus, in one embodiment, the storage 10, $10a$, $10b$ may be comprised of one or more sequential access storage devices, such as hard disk drives and magnetic tape or may include non-sequential access storage devices such as solid state drives (SSD), for example. Each device of storage 10 (FIG. 2), $10a$, $10b$ may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments, for example, storage units may be disks that are configured as a Redundant Array of Independent Disk (RAID) storage ranks $11a$ (FIG. 2), . . . $11n$, in which one or more RAID storage rank is an array of hard disks in a RAID configuration to facilitate data recovery in the event of loss of a hard disk. The storage units of the storage 10, $10a$, $10b$ may also other types of storage such as solid state drives in a RAID configuration to facilitate data recovery in the event of loss of a solid state drive. The storage units of the storage 10 (FIG. 2), $10a$, $10b$ may be configured to store data in subunits of data storage such as volumes, tracks, etc.

Each storage controller 4 (FIG. 2), $4a$, $4b$ includes a CPU complex 12 (FIG. 2) including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), $4a$, $4b$ further has a memory 20 that includes a storage manager 24 for managing storage operations including writing data to or reading data from an associated storage 10 (FIG. 2), $10a$, $10b$ in response to an I/O data request from a host or mirrored data from another data storage system. A cache 28 of the memory 20 may comprise one or more of different types of memory, such as RAMs, write caches, read caches, NVS, etc. The different types of memory that comprise the cache may interoperate with each other. The CPU complex 12 of each storage controller 4 (FIG. 2), $4a$, $4b$ may have multiple clusters of processors, each cluster having its own assigned memory 20, storage manager 24, cache 28, etc. The processing and memory resources assigned each cluster may be physical, virtual, shared, transferrable or dedicated, depending upon the particular application.

Writes from the hosts $1a$ . . . $1n$ may initially be written to a cache 28 of the primary storage controller $4a$ and then later destaged to the storage $10a$ of the primary storage system $2a$. Read requests from the hosts $1a$ . . . $1n$ may be satisfied from a cache 28 of the primary storage controller $4a$ if the corresponding information is available in that cache 28, otherwise the information is staged from the storage $10a$ to the cache 28 and then provided to the requesting host $1a$ . . . $1n$.

Writes from the hosts $1a$ . . . $1n$ initially written to the cache 28 and the storage $10a$ of the primary storage controller $4a$, may be mirrored by a storage manager 24 of the primary storage controller $4a$ to the secondary storage controller $4b$. Mirrored data may initially be written to a cache 28 of the secondary storage controller $4b$ and then later destaged to the storage 10b controlled by the secondary storage controller 4b of the secondary storage system 2b.

The memory 20 of the storage controller 4 (FIG. 2), 4a, 4b includes a cache directory 30 which identifies tracks having data stored in the cache 28 as a result of a prestage or stage operation which transfers the data of a track stored in the storage 10 (FIG. 2), 10a, 10b to the cache 28, or as a result of a host write operation which writes data to the cache 28 for subsequent destaging to the corresponding track or tracks of the storage 10 (FIG. 2), 10a, 10b. In the illustrated embodiment, the cache directory 30 is implemented in the form of a known data structure which is a hash table of all tracks in cache 28. Each track is hashed into a slot of the cache directory 30 which includes a track identification (ID) and an indication as to whether the data of the track is "dirty", that is, has not yet been safely destaged to the corresponding track of the storage 10 (FIG. 2), 10a, 10b. Multiple tracks hashed into a slot are linked together. It is appreciated that a suitable cache directory may be implemented using other types of data structures.

Operations including I/O operations of the storage manager 24, including cache write, stage, prestage and destage operations, for example, utilize Task Control Blocks (TCBs) 32 of the memory 20. Each TCB is a data structure in the operating system kernel containing the information needed to manage a particular process. Storage controllers may move information to and from storage, and to and from the cache by using TCBs to manage the movement of data. When a write request issues from a host to a storage controller or data is mirrored from the primary data storage system to a secondary data storage system, a TCB may be allocated from the operating system code. The TCB is used to maintain information about the write process from beginning to end as data to be written is passed from the source through the cache to the storage. If the cache is full, the TCB may be queued until existing data in the cache can be destaged (i.e., written to storage), in order to free up space.

As previously noted, TCBs may be classified on the basis of the task being controlled by the particular TCB. For example, a "background" TCB is a TCB that controls an operation which is not directly related to a host input/output operation. Another type of TCB is a "foreground" TCB that controls an operation which is directly related to a host input/output operation.

In one aspect of the present description, the storage manager 24 includes wait classified cache write logic 33 which is configured to classify and reclassify TCBs in connection with cache write operations in one of a plurality of different wait classifications including a short wait classification and a long wait classification in one embodiment. As explained in greater detail below, TCBs classified and reclassified in this manner may be enqueued and re-enqueued in a wait queue for different minimum durations of time for purposes of throttling host input/output operations so as to reduce or eliminate undesired suspensions of mirroring operations due to expirations of time-out periods.

The storage manager 24 further includes a data replication logic 35 (FIG. 2) of the storage manager 24 which is configured to synchronously generate copies of the primary volume1 (FIG. 1) of the primary data storage system 2a as a secondary volume2 (FIG. 1) of the secondary data storage systems as represented by the secondary data storage system 2b. A primary-secondary pair of volumes, volume1, volume2 are in an synchronous copy or mirror relationship 37 such that updates to the primary volume1 are synchronously mirrored to each secondary volume2.

One or more copy relationships 37, which may be maintained by the data replication logic 35 for the primary and secondary storage controllers 4a, 4b, (FIG. 1) associate primary storage locations in the primary storage drive 10a and corresponding secondary storage locations in each of the secondary storage drives as represented by the storage drive 10b of the mirror relationship, such that updates to the primary storage drive 10a locations are mirrored, that is, copied to the corresponding secondary storage drive or drives 10b locations. For example, source storage locations in a primary storage volume1 (FIG. 1) of storage drive 10a may be synchronously mirrored in a mirror data replication operation to target storage locations of a secondary volume2 of the storage drive 10b pursuant to a mirror copy relationship 37 (FIG. 2). Similarly, source storage locations in the primary storage volume1 (FIG. 3) of storage drive 10a may be synchronously mirrored in a mirror data replication operation to additional target storage locations of another secondary volume2 of another secondary data storage system pursuant to a mirror copy relationship 37 (FIG. 2).

In the illustrated embodiment, a copy relationship 37 comprises a peer-to-peer synchronous mirror relationship for a pair of storage locations in which updates to the primary (source) storage locations of the mirror relationship 37 are synchronously mirrored to the secondary (target) storage locations of the mirror relationship 37. It is appreciated that other types of copy relationships such as asynchronous, for example, may be established, depending upon the particular application.

In the configuration illustrated in FIG. 1, the storage controller 4a and the data storage drive 10a have been configured as a primary storage control unit and the primary storage, respectively, of a primary data storage system 2a. Similarly, the storage controller 4b and its data storage drive 10b have been configured as a secondary storage control unit and a secondary storage, respectively, of a secondary data storage system 2b. Hence, in the configuration depicted in FIG. 1, the storage controller 4a will be referred to as a primary storage controller or control unit 4a, and the data storage drive 10a will be referred to as a primary storage drive 10a. Similarly, the storage controller or control unit 4b will be referred to as a secondary storage controller or control unit 4b and the data storage drive 10b will be referred to as a secondary data storage drive 10b. In this embodiment, there may be multiple secondary data storages such that a copy relation can be in a one to many relationship, which is also referred to as a multi-target relationship.

In a particular copy relationship, the source unit is often referred to as the primary and the target unit is often referred to as the secondary. Replication relationships are defined between storage units of the primary data storage drive 10a and the secondary data storage drives 10b. Notwithstanding a reference to the data storage drive 10a as "primary" and the data storage 10b as "secondary," particular storage units of the data storages 10a, 10b, may play both a primary (or source role) and a secondary (or target role) depending upon the particular copy relationship.

In data replication systems, data is typically maintained in volume pairs, comprising a primary volume such as volume1 (FIG. 1), for example, in a primary storage system and a corresponding secondary volume such as volume2, for example, in a secondary storage system that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary devices. A primary device such as volume1, for example, may be in a one to many mirror multi-target relationship with multiple secondary devices, such as volume2 of the secondary data storage systems 2b.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

In one embodiment, the storage devices 10, 10a, 10b, may be comprised of one or more sequential access storage devices, such as hard disk drives and magnetic tape or may include non-sequential access storage devices such as solid state drives (SSD), for example. Each storage device 10, 10a, 10b, may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

One mode of the data replication logic 35 managing the copy relationships, may be implemented with synchronous copy operations, such as a peer-to-peer remote copy (PPRC) program modified as appropriate in accordance with present description. The described operations may be implemented with other programs such as other copy programs or other global recovery programs modified as appropriate in accordance with present description.

The storage manager 24 further includes safe data commit logic 40 which periodically scans the cache directory 30 for dirty data to be destaged to storage 10 (FIG. 2), 10a, 10b (FIG. 1). The safe data commit process permits an operator to be assured that anything written to cache 28 prior to the safe data commit scan start time has been successfully destaged and safely stored on the storage 10 (FIG. 2), 10a, 10b (FIG. 1).

In the illustrated embodiment, the storage manager 24 including the wait classified cache write logic 33, is depicted as software stored in the memory 20 and executed by the CPU complex 12. However, it is appreciated that the logic functions of the storage manager 24 may be implemented as hardware, software, firmware or combinations of one or more thereof, depending upon the particular application.

The storage manager 24 (FIG. 2) in one embodiment may store data in the cache 28 and transfer data between the cache 28 and storage 10 (FIG. 2), 10a, 10b (FIG. 1) in tracks. In writing a track to cache, a TCB allocates one or more segments of cache storage to write the track. Similarly, the storage manager 24 (FIG. 2) in one embodiment may transfer data from the primary storage drive 10a (FIG. a) to a secondary storage drive 10b in tracks. As used herein, the term track may refer to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Thus, as used herein, a segment is a subunit of a track. Accordingly, the size of subunits of data processed in cache write and safe data commit processes in accordance with the present description may vary, depending upon the particular application. Thus, as used herein, the term "track" or the term "segment" refers to any suitable subunit of data storage or transfer.

The system components 1a (FIG. 1), 1b . . . 1n, 4 (FIG. 2), 6 are connected to a network 6 which enables communication among these components. Thus, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 3:
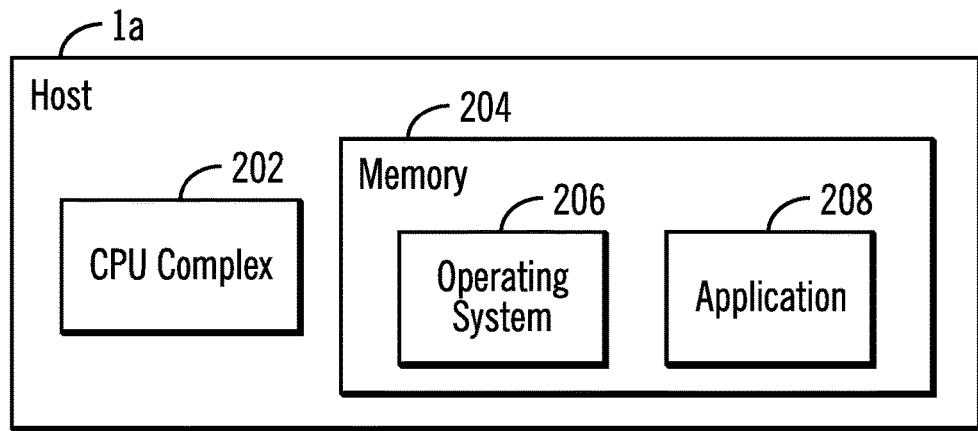
FIG. 3 illustrates an example of a host in the computing environment of FIG. 1.

A typical host as represented by the host 1a of FIG. 3 includes a CPU complex 202 and a memory 204 having an operating system 206 and an application 208 that cooperate to read data from and write data updates to the storage 10 (FIG. 2), 10a, 10b via a storage controller 4, 4a, 4b. An example of a suitable operating system is the z/OS operating system. It is appreciated that other types of operating systems may be employed, depending upon the particular application.

Figure 4:
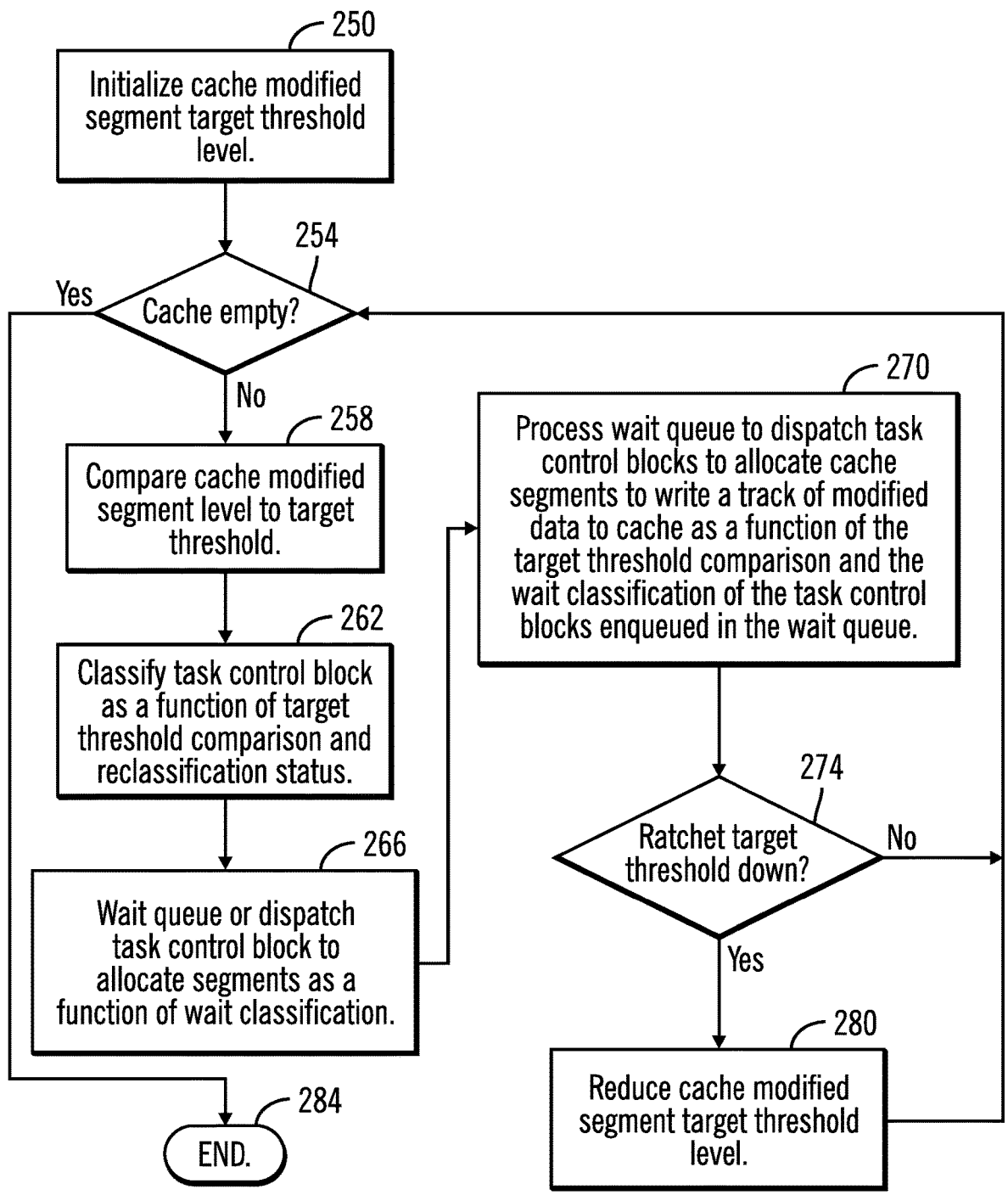
FIG. 4 illustrates an example of wait classified cache write operations in accordance with one aspect of the present description.

FIG. 4 depicts one example of operations of a wait classified cache write process to throttle host output operations to the primary storage controller 4a (FIG. 1) so as to facilitate more rapid draining of the cache or caches 28 (FIG. 2) of the secondary storage controller 4b, in accordance with one aspect of the present description. In this example, and referring generally to FIGS. 1, 2, 4 and 5, after safe data commit logic 40 initiates a safe data commit process to empty a cache 28 of the secondary data storage system 2b, target threshold logic 240 (FIG. 5) of the wait classified cache logic 33 is configured to initialize (block 250) a target threshold level for modified data such as modified segments of data mirrored from the primary data storage system 2a and cached in a cache 28 of the secondary data storage system 2b. The initial setting of the target threshold level may in one embodiment be set at a relatively high percentage of the total capacity of the cache 28 such as 95%, for example. It is appreciated that a target threshold level may be set at other values, depending upon the particular application.

The wait classified cache logic 33 is configured to determine (block 254) whether the cache is empty, and if not, the target threshold level logic 240 of the wait classified cache logic 33 is further configured to compare (block 258) the current level of cache modified segments in the cache to the cache modified segment target threshold level. Task control block classification logic 260 of the wait classified cache write logic 33 is configured to classify a task control block for allocating cache segments for a single track of a single track cache write operation, or multiple tracks of a chain of tracks of a multi-track chain cache write operation in one of a plurality of different wait classifications having different associated wait times if the task control block is enqueued in a wait queue. In one embodiment, the wait classifications includes a first wait class of task control blocks having an associated wait time of a first duration, such as a relatively long duration such as six seconds, for example. Thus, one wait class of task control blocks is a long wait class in one embodiment. The wait classifications may also include, for example, a second wait class of task control blocks having an associated wait time of a second duration, such as a relatively short duration such as one second, for example. Thus, another wait class of task control blocks is a short wait class in one embodiment. It is appreciated that the particular wait durations of each wait class may vary, depending upon the particular application.

In the example of FIG. 4, the task control block classification logic 260 is configured to classify (block 262) a task control block for allocating cache storage for writing in cache one or more tracks of a cache write operation, as a function of the target threshold comparison (block 258) and a reclassification status which indicates whether the particular task control block has previously been classified in a wait classification. The classification and reclassification (block 262) of task control blocks as a function of the target threshold comparison (block 258) and an associated reclassification status is described in greater detail below in connection with FIG. 6.

In response to the task control block classification logic 260 classifying (block 262) a task control block of a cache write operation in a particular wait classification, wait queue logic 264 (FIG. 5) of the wait classified cache write logic 33 is configured to selectively either enqueue (block 266) the classified task control block in a wait queue or dispatch the wait classified task control block to allocate cache segments, as a function of the particular wait classification in which the task control block has been classified (block 262). The selective wait queue enqueuing or dispatching is described in greater detail below in connection with FIG. 7.

The wait queue logic 264 of the wait classified cache write logic 33 is further configured to process (block 270) the wait queue to dispatch task control blocks to allocate cache segments to write a track of modified data to cache as a function of the target threshold comparison (block 258) and the wait classifications (block 262) of the task control blocks enqueued in the wait queue. The wait classified cache write logic 33 includes a memory resource 272 (FIG. 5) to implement the wait queue. The operations of the wait queue logic 264 in processing the wait queue to selectively enqueue task control blocks on the wait queue or dispatch task control blocks from the wait queue is described in greater detail below in connection with FIG. 7.

The target threshold level logic 240 of the wait classified cache write logic 33 is further configured to determine (block 274) whether to ratchet down the target threshold level for modified segments in the cache to reduce the cache modified segment target threshold level to a reduced target threshold level. In one embodiment, the target threshold may be periodically ratcheted downward upon expiration of a period of a predetermined duration such as four seconds, for example. It is appreciated that periods of other durations may be utilized and that other techniques for determining when to ratchet a target threshold may be utilized, depending upon the particular application. In this manner, the cache modified segment target threshold level down may be repeatedly ratcheted downward to reduce the cache modified segment target threshold level in a sequence of increasingly reduced cache modified segment target threshold levels.

If it is determined (block 274) to ratchet the target threshold downward, the target threshold level logic 240 is further configured to reduce (block 280) the target threshold level. In one embodiment, the target threshold may be decremented by a variable or constant amount such as 5% of cache capacity, for example. It is appreciated that other decrement amounts, fixed or variable, and other techniques for ratcheting the target threshold level downward, may be utilized, depending upon the particular application.

After the target threshold level has been reduced (block 280) or if it is determined (block 274) not to reduce the target threshold level at that point in the process, another determination (block 254) may be made as to whether the cache has been fully emptied. If not, the safe data commit process with wait classified cache writing continues in the manner set forth in FIG. 4 until the cache is empty. Once the cache is empty (block 254), the safe data commit operation to empty the cache ends (block 284).

Figure 6:
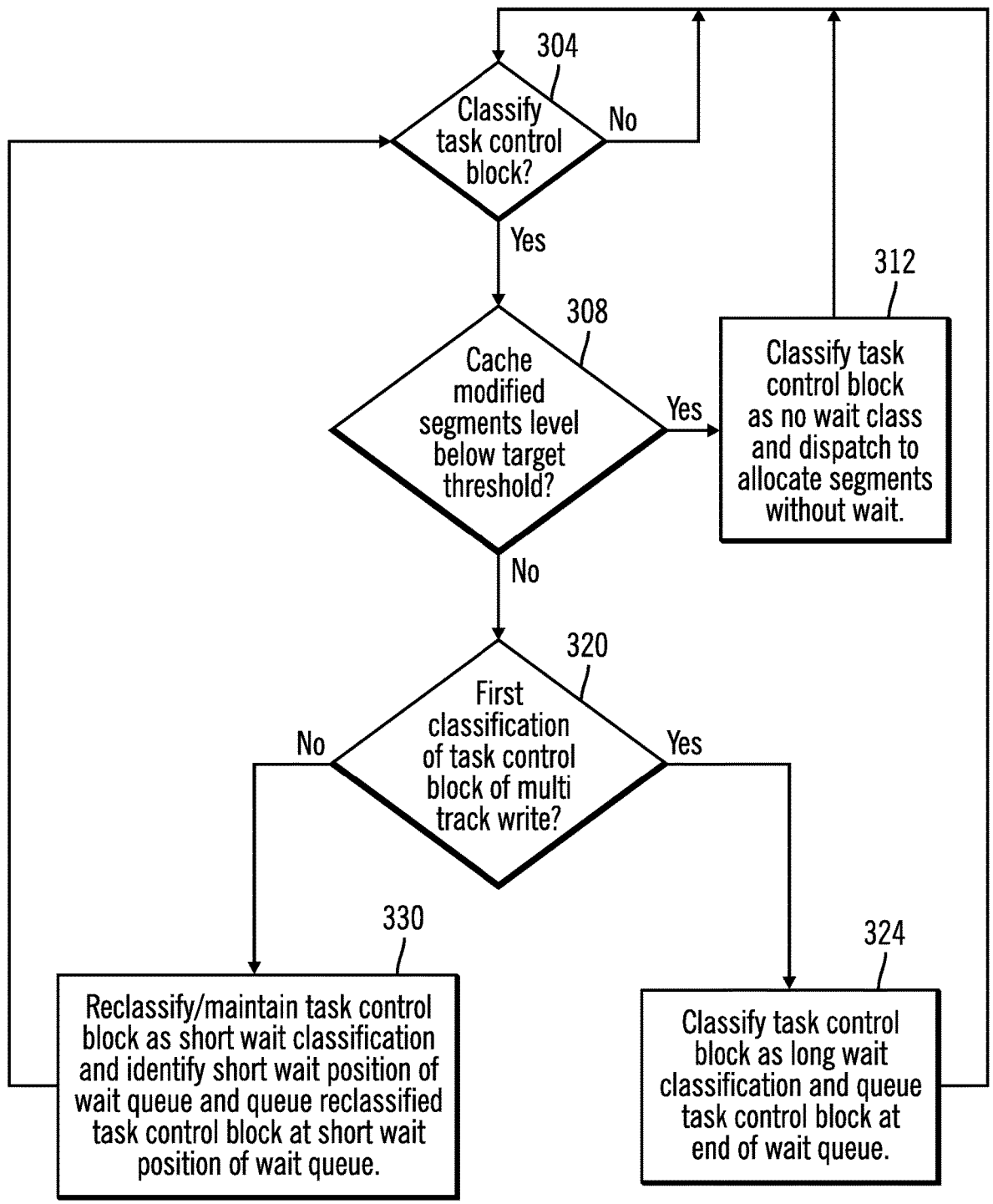
FIG. 6 illustrates an example of task control block wait classification operations in accordance with one aspect of the present description.

FIG. 6 depicts one example of the operations of the task control block classification logic 260 in cooperation with the wait queue logic 264, in greater detail. As described above in connection with FIG. 4, the task control blocks being classified are used to allocate cache storage for writing in cache one or more tracks of a cache write operation. The task control block classification logic 260 classifies (block 262, FIG. 4) a task control block in one of a plurality of wait classifications, as a function of the target threshold comparison (block 258) and a reclassification status which indicates whether the particular task control block has previously been classified in a wait classification.

Figure 5:
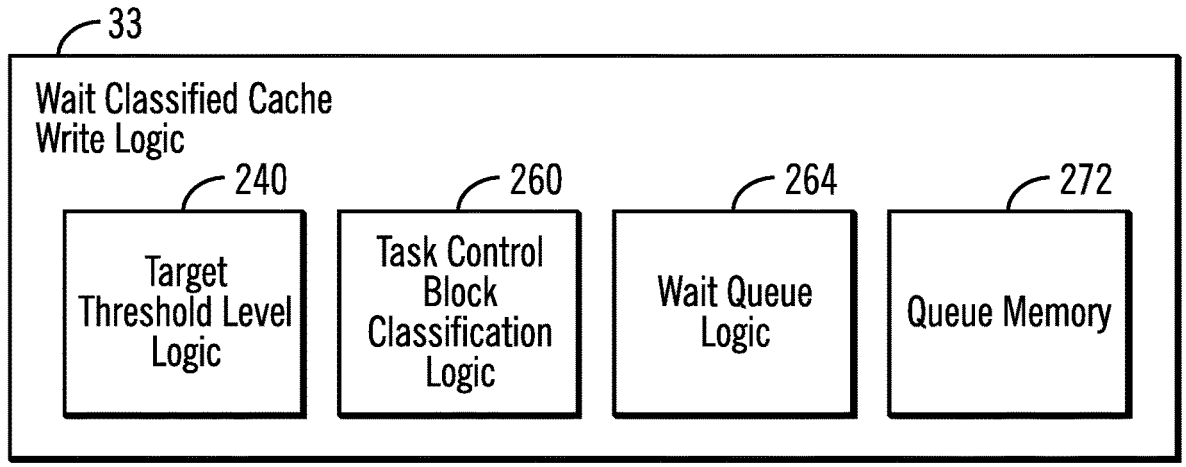
FIG. 5 illustrates an example of wait classified cache write logic in the storage system of FIG. 2.
Figure 8:
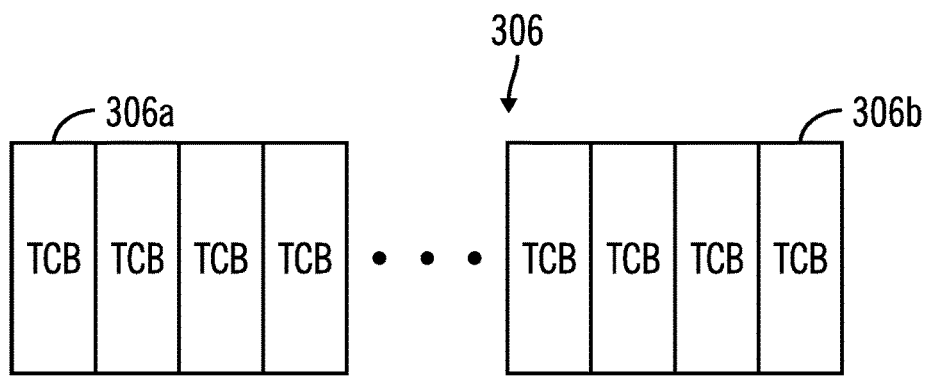
FIG. 8 depicts an example of a wait queue having task control blocks classified and enqueued in accordance with one aspect of the present description.

Referring primarily to FIGS. 5, 6, in response to a determination (block 304) to classify a task control block of a cache write operation in a wait classification, the task control block classification logic 260 is configured to determine (block 308) whether the current amount of modified segments stored in the cache 28 is below the target threshold level for modified segments in cache, which threshold level has been set as described above in connection with FIG. 4. If it is determined (block 308) that the current amount of modified segments stored in the cache 28 is below the target threshold level for modified segments in cache, throttling the host output to the primary storage system 2a may be bypassed. Instead, a task control block for a cache write operation may be classified (block 312) in a "no wait" classification and immediately dispatched to allocate cache storage segments to write a track of modified data in the cache 28 of the secondary storage system 2b, without being enqueued on the wait queue 306 (FIG. 8).

Conversely, if it is determined (block 308) that the current amount of modified segments stored in the cache 28 is above the target threshold level for modified segments in cache, throttling the host output to the primary storage system 2a may be implemented. As noted above, the task control block classification logic 260 classifies a task control block in one of a plurality of wait classifications, as a function of the target threshold comparison (block 308) and a reclassification status which indicates whether the particular task control block has previously been classified in a wait classification. Accordingly, the task control block classification logic 260 is configured to determine (block 320) whether the task control block has previously been wait classified or whether this is the first classification of the task control block in a wait classification. As explained in greater detail below, a task control block may be classified a first time and then reclassified one or more additional times in various wait classifications when controlling a multi-track cache write operation. In addition, the task control block may include a field which indicates whether the task control block has been classified a first time or reclassified one or more additional times in various wait classifications. In one embodiment, this field may be inspected in determining (block 320) whether the task control block has previously been wait classified or whether this is the first classification of the task control block in a wait classification.

In the illustrated embodiment, a task control block which is being classified a first time is classified in a long wait classification. Conversely, a task control block which is being classified a second or subsequent time, is classified in a short wait classification. Hence, the field which indicates whether the task control block has been classified a first time or has been reclassified in a short wait classification, may be set to indicate that the task control block has already been made to wait a long wait duration after the long wait classified task control block is dispatched so that when the task control block is reclassified, it is reclassified in a short wait classification upon a second or subsequent reclassification.

If it is determined (block 320) that the task control block has not previously been wait classified such that this is the first classification of the task control block in a wait classification, the task control block classification logic 260 is configured to classify (block 324) the task control block in a first wait classification, that is, a long wait classification and enqueue the long wait classified task control block at the end 306a (FIG. 8) of the wait queue 306. Accordingly, the TCB enqueued at the end 306a may wait in the wait queue a duration of time at least equal to the "long wait" duration (six seconds in one embodiment) for which it has been classified.

The TCBs are enqueued on the wait queue in the order in which they will be subsequently dequeued and dispatched to allocate cache segments. Accordingly, the TCB at the front 306b will be dequeued from the wait queue 306 before any other TCB of the wait queue. Conversely the TCB at the end 306a will be dequeued and dispatched after all TCBs positioned ahead of that TCB initially positioned at the end 306a of the wait queue. have been dispatched to allocate cache storage for a track write operation.

If it is determined (block 320) that the task control block has previously been wait classified such that this is a second or subsequent classification of the task control block in a wait classification, the task control block classification logic 260 is configured to reclassify (block 330) the task control block in a second wait classification, that is, a short wait classification, which is different, that is, shorter than the duration of the long wait classification. The short wait classified task control block is enqueued at an appropriate short wait position within the queue 306 so that the short wait classified TCB may wait on the wait queue for a duration of time at least equal to the "short wait" duration (one second in one embodiment) for which it has been classified.

In the illustrated embodiment, an appropriate short wait position within the queue 306 may be determined by scanning the TCBs of the wait queue 306 beginning at the front 306b of the wait queue 306 and identifying a TCB having a wait duration longer than the short duration and enqueuing the short wait classified TCB ahead of that identified TCB in the wait queue. For example, if scanning the TCBs of the wait queue 306 beginning at the front 306b of the wait queue 306 identifies a first TCB having a long wait classification, the short wait classified TCB is enqueued in the wait queue at a position ahead of the first identified long wait classified TCB.

In this manner, a task control block for a multi-track cache write operation may be enqueued on the wait queue for a long wait, such as six seconds, for example, the first time the task control block is used, and may be enqueued on the wait queue for a short wait, such as one second, for example, each subsequent time the task control block is used for subsequent cache writes of the remaining tracks of the multi-track cache write operation. As a result, time-out suspensions caused by throttling of host input-output operations to facilitate cache draining, may be reduced or eliminated, particularly for multi-track cache write operations.

In addition, when re-enqueuing a task control block on the wait queue for subsequent track writes to cache, the re-enqueued task control blocks may be enqueued in order of execution so that they can be serviced without searching. Thus, the task control block at the front at the wait queue may be serviced the quickest.

Figure 7:
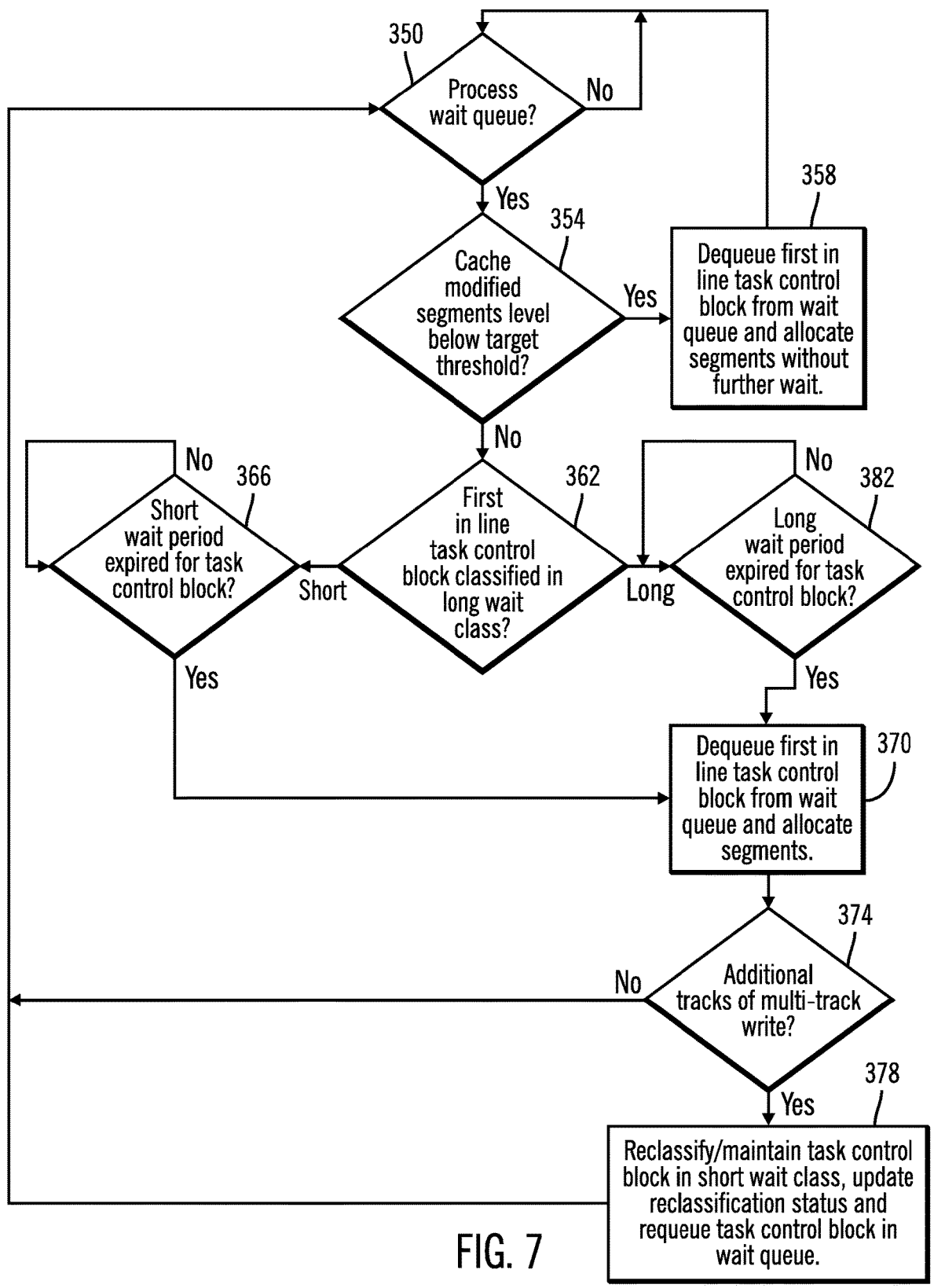
FIG. 7 illustrates an example of wait queue processing in accordance with one aspect of the present description.

FIG. 7 depicts one example of wait queue processing operations of the wait queue logic 264 in cooperation with the task control block classification logic 260 (FIG. 5), in greater detail. As described above in connection with FIG. 4, the wait queue 306 (FIG. 8) is processed (block 270, FIG. 4) to dispatch task control blocks from the wait queue to allocate cache storage such as cache segments to write a track of modified data to cache as a function of a target threshold comparison and the wait classifications of the task control blocks enqueued in the wait queue.

Referring primarily to FIGS. 5, 7 and 8, in response to a determination (block 350) that the wait queue 306 is to be processed, the wait queue logic 264 is configured to determine (block 354) whether the current amount of modified segments stored in the cache 28 is below the target threshold level for modified segments in cache, which threshold level has been set as described above in connection with FIG. 4. If it is determined (block 354) that the current amount of modified segments stored in the cache 28 is below the target threshold level for modified segments in cache, further throttling of the host output to the primary storage system 2a may be bypassed. Instead, a task control block for a cache write operation which has reached the front 306b of the wait queue 306 may be dequeued (block 358) and dispatched without further delay to allocate cache storage segments to write a track of modified data in the cache 28 of the secondary storage system 2b, even if the task control block at the front of the wait queue 306 has not yet been on the wait queue for a duration of time at least equal to the wait classification of the task control block. Thus, if the task control block at the front 306b of the wait queue 306 has been wait classified in a long wait classification, for example, that task control block may be dispatched immediately to allocate cache segments even if the task control block has been on the wait queue for less than the associated long wait duration (such as six seconds, for example). Similarly, if the task control block at the front 306b of the wait queue 306 has been wait classified in a short wait classification, for example, that task control block may be dispatched immediately to allocate cache segments to write a track of modified segments to cache even if the task control block has been on the wait queue for less than the associated short wait duration (such as one second, for example).

Conversely, if it is determined (block 354) that the current amount of modified segments stored in the cache 28 is above the target threshold level for modified segments in cache, further throttling of the host output to the primary storage system 2a may be implemented. Accordingly, the wait queue logic 264 is further configured to determine (block 362) if the task control block at the front 306b of the wait queue 306 has been classified in a long wait classification or a short wait classification. If it is determined (block 362) that the task control block at the front 306b of the wait queue 306 has been classified in the long wait classification, the wait queue logic 264 is further configured to determine (block 382) whether that task control block has been waiting on the wait queue 306 for a duration of time equal to or exceeding the long wait duration of time (such as six seconds, for example) of the long wait classification. If not, the task control block continues to wait on the wait queue 306.

In one embodiment, the duration of time that a particular task control block has been waiting on the wait queue 306 may be determined by noting the current time deducting from the current time the time the task control block was enqueued on the wait queue to provide the amount of wait time which has elapsed for the task control block on the wait queue. The elapsed wait time may be compared to the long wait duration associated with the long wait classification of the task control block to determine (block 382) whether that task control block has been waiting on the wait queue 306 for a duration of time equal to or exceeding the long wait duration of time (such as six seconds, for example) of the long wait classification. If not, the task control block continues to wait on the wait queue 306. If not, the long wait classified task control block continues to wait on the wait queue 306.

Once it is determined (block 382) that the long wait classified task control block at the front 306b of the wait queue 306 has been waiting on the wait queue 306 for a duration of time equal to or exceeding the long wait duration of time (such as six seconds, for example) of the long wait classification, the task control block at the front 306b of the wait queue 306 is dequeued (block 370) from the wait queue and dispatched to allocate one or more cache segments to write a modified track to cache. Conversely, if it is determined (block 362) that the task control block at the front 306b of the wait queue 306 has been classified in the short wait classification, the wait queue logic 264 is further configured to determine (block 366) whether that task control block has been waiting on the wait queue 306 for a duration of time equal to or exceeding the short wait duration of time (such as one second, for example) of the short wait classification. If not, the task control block continues to wait on the wait queue 306.

Once it is determined (block 366) that the short wait classified task control block at the front 306b of the wait queue 306 has been waiting on the wait queue 306 for a duration of time equal to or exceeding the short wait duration of time (such as one second, for example) of the short wait classification, the task control block at the front 306b of the wait queue 306 is dequeued (block 370) from the wait queue and dispatched to allocate one or more cache segments to write a modified track to cache.

The wait queue logic 264 is further configured to determine (block 374) whether the cache write operation is a multi-track write operation and if so whether there are additional tracks of the multi-track write operation to be written to cache. If it is determined (block 374) that there are additional tracks of a multi-track cache write operation to be written to cache, the task control block which was dequeued (block 370) from the front 306b of the queue 306 and dispatched to allocate cache segments of the previous track of the multi-track write operation, is reclassified (block 378) from the long wait classification to the short wait classification. In addition, a field of the task control block which indicates whether the task control block has been classified a first time or already reclassified in a short wait classification may be updated by setting it to indicate that the task control block has already been made to wait a long wait duration (block 382) so that the task control block is reclassified in a short wait classification.

However, if the task control block which was dequeued (block 370) from the front 306b of the queue 306 was already reclassified in the short wait classification as indicated by a previously set reclassification field of the task control block, the task control block short wait classification is maintained (block 378). Upon reclassification or maintaining the task control block in the short wait classification, the task control block is requeued in the wait queue 306 (as described above in connection with block 330, FIG. 6) to await processing (block 350).

It is seen from the above that in one aspect wait classified cache write operations in accordance with the present description, TCBs may be classified and reclassified in different wait classifications and may be enqueued and re-enqueued in a wait queue for different minimum durations of time for purposes of throttling host input/output operations so as to reduce or eliminate undesired suspensions of mirroring operations due to expirations of time-out periods when draining a cache in a secondary data storage system. Other aspects and advantages may be realized, depending upon the particular application.

Figure 9:
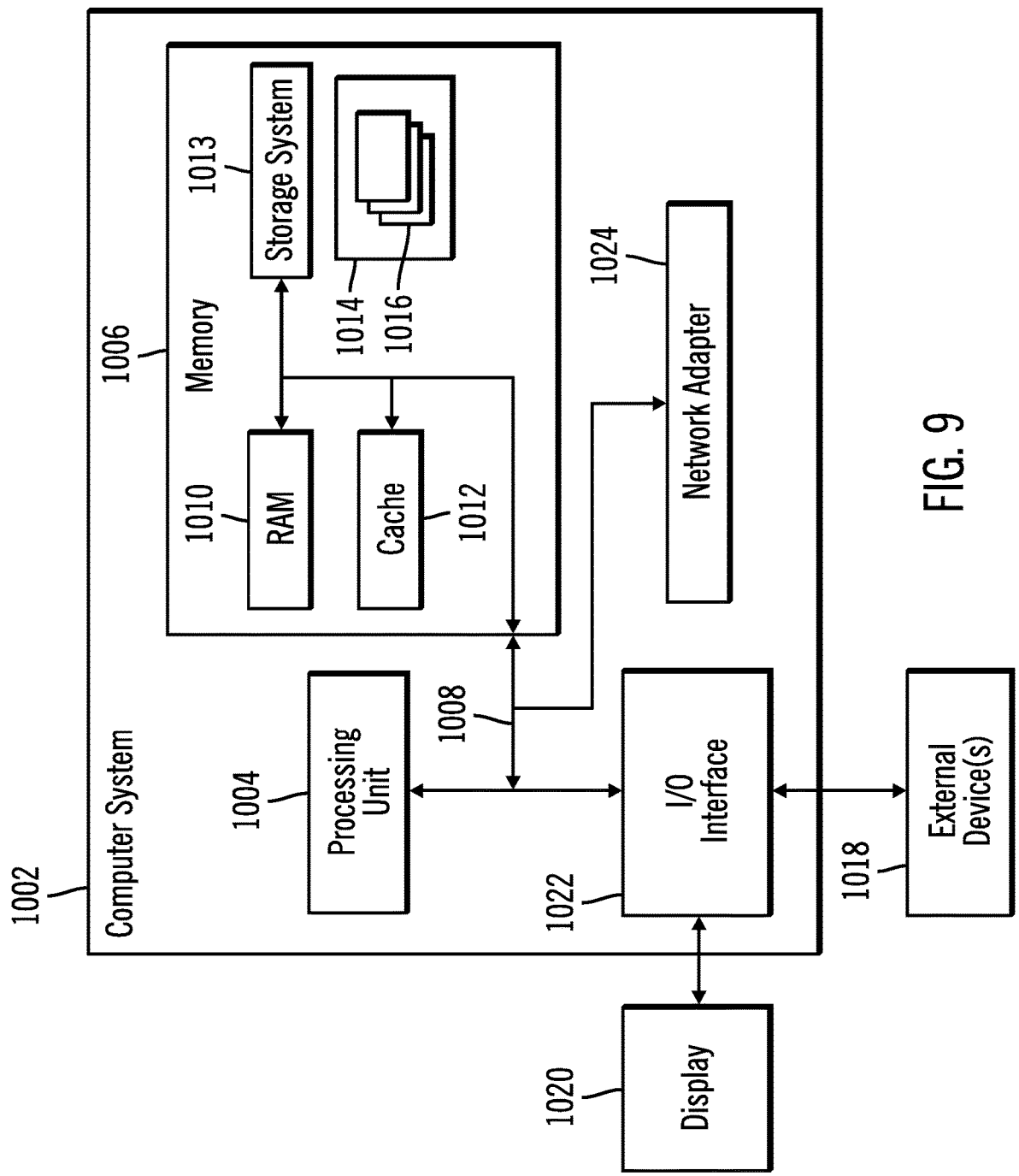
FIG. 9 illustrates a computer embodiment employing wait classified cache writes in a data storage system in accordance with the present description.

The computational components of the figures may each be implemented in one or more computer systems, such as the computer system 1002 shown in FIG. 9. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:

classifying a task control block for allocating cache storage for writing tracks of a chain of tracks of a multi-track cache write operation in a first wait class of task control blocks having an associated wait time of a first duration;

queueing a classified task control block in a wait queue wherein the task control block is queued classified in the first wait class;

allocating cache storage for a cache, for writing in the cache, a track of the multi-track cache write operation using the task control block classified in the first wait class after the task control block has been in the wait queue for a duration of time at least equal to the first duration of time;

reclassifying the task control block in a second wait class of task control blocks having an associated wait time of a second duration different from the first duration;

re-enqueueing the task control block in a wait queue, wherein the task control block is re-enqueued and is reclassified in the second wait class; and allocating additional cache storage for the cache, for writing in the cache another track of the multi-track cache write operation using the task control block classified in the second wait class after the task control block has been in the wait queue for a duration of time at least equal to the second duration of time.

2. The method of claim 1 wherein the reclassifying the task control block in a second wait class includes determining whether the task control block has already been in the wait queue for a duration of time at least equal to the first duration of time and reclassifying the task control block in the second wait class of task control blocks if the task control block has already been in the wait queue for a duration of time at least equal to the first duration of time.

3. The method of claim 1 wherein a task control block classified in the first wait class is queued at an end position of the wait queue.

4. The method of claim 1 wherein a task control block reclassified in the second wait class is queued at a position in the wait queue in front of a task control block classified in the first wait class.

5. The method of claim 1 wherein the multi-track cache write operation caches data mirrored from a primary storage controller to a cache of a secondary storage controller in a mirror relationship with the primary storage controller.

6. The method of claim 5 wherein classifying the task control block includes setting a cache modified segment target threshold level, comparing the level of cache modified segments in the cache to the cache modified segment target threshold level, and classifying the task control block as a function of the comparison of the level of cache modified segments in the cache to the cache modified segment target threshold level.

7. The method of claim 6 further comprising throttling down host output operations to the primary storage controller, said throttling including queueing a task control block in the wait queue if the level of cache modified segments in the cache exceeds the cache modified segment target threshold level.

8. The method of claim 6 further comprising repeatedly ratcheting the cache modified segment target threshold level down to reduce the cache modified segment target threshold level in a sequence of increasingly reduced cache modified segment target threshold levels.

9. A computer program product for use with a host and a primary data storage system having a primary storage controller and a primary device controlled by the primary storage controller and configured to store data, and at least one secondary data storage system having a secondary storage controller and a secondary device controlled by the secondary storage controller and configured to store data, wherein the secondary storage controller has a processor and a cache and wherein the computer program product comprises a computer readable storage medium having program instructions embodied therewith, the program instructions executable by a processor of the secondary storage controller to cause processor operations, the processor operations comprising:
    classifying a task control block for allocating cache storage for writing tracks of a chain of tracks of a multi-track cache write operation in a first wait class of task control blocks having an associated wait time of a first duration;
    queueing a classified task control block in a wait queue wherein the task control block is queued classified in the first wait class;
    allocating cache storage for a cache, for writing in the cache, a track of the multi-track cache write operation using the task control block classified in the first wait class after the task control block has been in the wait queue for a duration of time at least equal to the first duration of time;
    reclassifying the task control block in a second wait class of task control blocks having an associated wait time of a second duration different from the first duration;
    re-enqueueing the task control block in a wait queue wherein the task control block is re-enqueued reclassified in the second wait class; and
    allocating additional cache storage for a cache, for writing in the cache another track of the multi-track cache write operation using the task control block classified in the second wait class after the task control block has been in the wait queue for a duration of time at least equal to the second duration of time.

10. The computer program product of claim 9 wherein the reclassifying the task control block in a second wait class includes determining whether the task control block has already been in the wait queue for a duration of time at least equal to the first duration of time and reclassifying the task control block in the second wait class of task control blocks if the task control block has already been in the wait queue for a duration of time at least equal to the first duration of time.

11. The computer program product of claim 9 wherein a task control block classified in the first wait class is queued at an end position of the wait queue.

12. The computer program product of claim 9 wherein a task control block reclassified in the second wait class is queued at a position in the wait queue in front of a task control block classified in the first wait class.

13. The computer program product of claim 9 wherein the multi-track cache write operation caches data mirrored from a primary storage controller to a cache of a secondary storage controller in a mirror relationship with the primary storage controller.

14. The computer program product of claim 13 wherein classifying the task control block includes setting a cache modified segment target threshold level, comparing the level of cache modified segments in the cache to the cache modified segment target threshold level, and classifying the task control block as a function of the comparison of the level of cache modified segments in the cache to the cache modified segment target threshold level.

15. The computer program product of claim 14 wherein the operations further comprise throttling down host output operations to the primary storage controller, said throttling including queueing a task control block in the wait queue if the level of cache modified segments in the cache exceeds the cache modified segment target threshold level.

16. The computer program product of claim 14 wherein the operations further comprise repeatedly ratcheting the cache modified segment target threshold level down to reduce the cache modified segment target threshold level in a sequence of increasingly reduced cache modified segment target threshold levels.

17. A system for use with a host and a primary data storage system having a primary storage controller and a primary device controlled by the primary storage controller and configured to store data, the system comprising:
    at least one secondary data storage system having a secondary storage controller and a secondary device controlled by the secondary storage controller and configured to store data, wherein the secondary storage controller has a processor, a cache and a computer program product comprising a computer readable storage medium having program instructions embodied therewith, the program instructions executable by a processor of the secondary storage controller to cause processor operations, the processor operations comprising:

classifying a task control block for allocating cache storage for writing tracks of a chain of tracks of a multi-track cache write operation in a first wait class of task control blocks having an associated wait time of a first duration;

queueing a classified task control block in a wait queue wherein the task control block is queued classified in the first wait class;

allocating cache storage for a cache, for writing in the cache, a track of the multi-track cache write operation using the task control block classified in the first wait class after the task control block has been in the wait queue for a duration of time at least equal to the first duration of time;

reclassifying the task control block in a second wait class of task control blocks having an associated wait time of a second duration different from the first duration;

re-enqueueing the task control block in a wait queue wherein the task control block is re-enqueued reclassified in the second wait class; and allocating additional cache storage for a cache, for writing in the cache another track of the multi-track cache write operation using the task control block classified in the second wait class after the task control block has been in the wait queue for a duration of time at least equal to the second duration of time.

18. The system of claim 17 wherein the reclassifying the task control block in a second wait class includes determining whether the task control block has already been in the wait queue for a duration of time at least equal to the first duration of time and reclassifying the task control block in the second wait class of task control blocks if the task control block has already been in the wait queue for a duration of time at least equal to the first duration of time.

19. The system of claim 17 wherein a task control block classified in the first wait class is queued at an end position of the wait queue.

20. The system of claim 17 wherein a task control block reclassified in the second wait class is queued at a position in the wait queue in front of a task control block classified in the first wait class.

21. The system of claim 17 wherein the multi-track cache write operation caches data mirrored from a primary storage controller to a cache of a secondary storage controller in a mirror relationship with the primary storage controller.

22. The system of claim 21 wherein classifying the task control block includes setting a cache modified segment target threshold level, comparing the level of cache modified segments in the cache to the cache modified segment target threshold level, and classifying the task control block as a function of the comparison of the level of cache modified segments in the cache to the cache modified segment target threshold level.

23. The system of claim 22 wherein the operations further comprise throttling down host output operations to the primary storage controller, said throttling including queueing a task control block in the wait queue if the level of cache modified segments in the cache exceeds the cache modified segment target threshold level.

24. The system of claim 22 wherein the operations further comprise repeatedly ratcheting the cache modified segment target threshold level down to reduce the cache modified segment target threshold level in a sequence of increasingly reduced cache modified segment target threshold levels.

* * * * *